(12) United States Patent
Watry et al.

(10) Patent No.: US 7,438,962 B1
(45) Date of Patent: Oct. 21, 2008

(54) CARBON WEAVE VAULTING POLE

(75) Inventors: Jeffrey P. Watry, Penfield, IL (US);
Ralph W. Paquin, Farmer City, IL (US);
Kenneth A. Hursey, St. Joseph, IL (US)

(73) Assignee: Gill Athletics, Inc., Champaign, IL (US)

( * ) Notice: Subject to any disclaimer, the term of this patent is extended or adjusted under 35 U.S.C. 154(b) by 475 days.

(21) Appl. No.: 11/237,334

(22) Filed: Sep. 28, 2005

Related U.S. Application Data

(60) Provisional application No. 60/614,201, filed on Sep. 29, 2004.

(51) Int. Cl.
*B29D 22/00* (2006.01)
*B29D 23/00* (2006.01)
*B32B 1/08* (2006.01)
*A63B 5/06* (2006.01)

(52) U.S. Cl. ............... 428/36.9; 428/35.7; 428/36.9; 428/36.1; 428/36.3; 428/190; 428/193; 428/408; 482/18

(58) Field of Classification Search ............... 428/35.7, 428/36.1, 36.3, 36.9, 36.91, 190, 193
See application file for complete search history.

(56) References Cited

U.S. PATENT DOCUMENTS

| | | | |
|---|---|---|---|
| 3,969,557 A | 7/1976 | Jenks | ............... 428/36 |
| 5,534,203 A * | 7/1996 | Nelson et al. | ............... 264/101 |

* cited by examiner

*Primary Examiner*—Michael C Miggins
(74) *Attorney, Agent, or Firm*—Philip L. Bateman

(57) ABSTRACT

A vaulting pole is made of five layers of fiberglass and carbon fiber. The first layer comprises a fiberglass or straight run carbon fiber material oriented such that at least half of the fibers are transverse to the longitudinal axis, the second layer comprises at least one circumference of a fiberglass or carbon fiber inner body wrap, the third layer comprises a fiberglass or carbon fiber trapezoidal sail piece, and the fourth layer comprises at least one circumference of a fiberglass or carbon fiber outer body wrap. At least one of the second, third, and fourth layers comprises carbon weave.

12 Claims, 2 Drawing Sheets

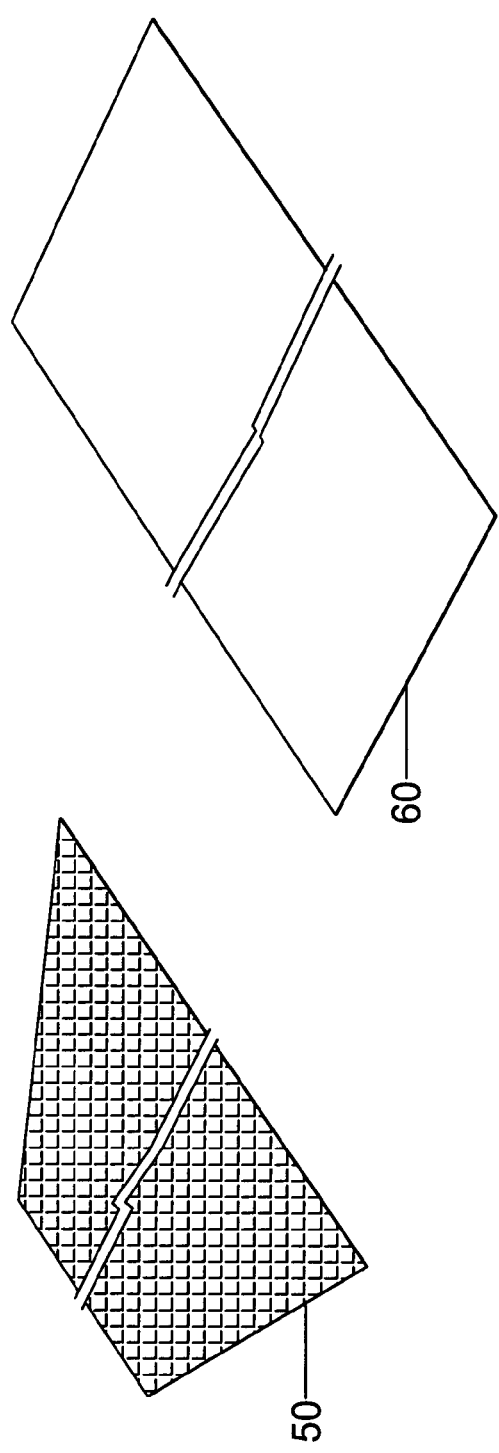
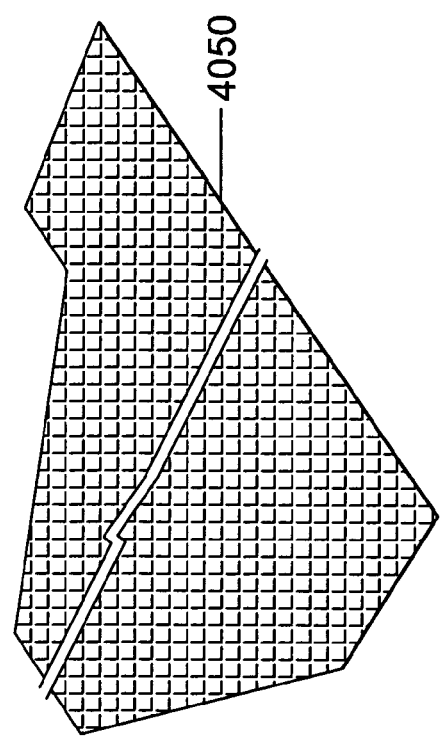
FIG. 2
FIG. 3

CARBON WEAVE VAULTING POLE

CROSS-REFERENCE TO RELATED APPLICATION

This application claims the benefit of U.S. Provisional Application Ser. No. 60/614,201, filed Sep. 29, 2004.

FIELD OF THE INVENTION

This invention relates to track and field equipment. More particularly, this invention relates to pole vaulting.

BACKGROUND OF THE INVENTION

Track and field is a sport in which athletes compete in running, jumping, and throwing events. In an event known as the pole vault, an athlete uses a pole to jump over a cross bar. The pole vault originated in Europe where men used a wooden pole to cross over canals filled with water. By the late 1800s, the pole vault had been added as an event at track and field competitions. The early pole vaulters used a bamboo pole with a sharp point on the tip end and competed on a grassy surface. In the first modern Olympics in 1896, the winning vault was a height of ten and one-half feet (about 3.2 meters). In the following century, techniques and equipment improved so dramatically that the current record is over twenty feet (over 6.1 meters). One of the biggest improvements in equipment was a change to poles made of fiberglass.

Fiberglass poles are relatively light in weight. They also have the ability to bend a substantial amount as the vaulter plants the end of the pole into a box and then to straighten out to propel the athlete over the cross bar. In terms of physics, the vaulting pole converts the kinetic energy of the vaulter into potential energy that can be used to overcome the force of gravity. The kinetic energy of the vaulter is equal to one-half of his mass times his velocity squared. To achieve the same optimal amount of bend, the pole used by a heavy vaulter must be stiffer than the pole used by a light vaulter. Accordingly, vaulting poles are manufactured for specific weight classes. If a vaulter uses a pole adapted for a heavier vaulter, the pole will not bend enough, and if a vaulter uses a pole adapted for a lighter vaulter, the pole will bend too much. In either case, the vaulter will not be able to achieve the maximum height.

There is no limit to the length of the pole. The best male vaulters use a pole that is about seventeen feet (about 5.2 meters) long while high school girls may use a pole that is only about twelve feet long (about 3.7 meters). Fiberglass poles of this length typically weigh about two to seven pounds (about one to three kilograms). The weight of the pole has an effect on the speed the vaulter can achieve before planting the pole. As the pole becomes lighter, the vaulter can run faster. And, because the height of the vault is related to the kinetic energy generated by the vaulter and because the kinetic energy is related to the velocity squared, any decrease in the weight of the pole is highly desirable.

Fiberglass poles are manufactured by first wrapping multiple layers of epoxy resin impregnated fiberglass thread, tapes, cloths, or sheets around a metal mandrel. The terms "thread," "tape," "cloth," and "sheet" are used arbitrarily in the industry depending on the width of the material. The glass fibers in the material may run in only one direction or they may be woven to run in two directions, perpendicular to each other. The direction in which the fibers run relative to the longitudinal axis of the pole determine the properties imparted to the pole. Fibers that run lengthwise (parallel to the longitudinal axis of the pole) provide column load bearing strength to the finished pole. Fibers that run radially (perpendicular to the longitudinal axis of the pole) provide hoop strength to the finished pole. Fibers that run at an angle between parallel and perpendicular provide both column load bearing strength and hoop strength. Fibers that run radially or at an angle, i.e., not parallel, are referred to herein as running transverse to the longitudinal axis.

After the layers of material are wrapped onto the mandrel, the pole is heated under pressure to cure (harden) the resin. The pole is then cooled and the mandrel removed. The pole is then cut to the desired length, caps are placed on the ends, and labels or the like is applied to the exterior of the pole. The manufacture of a specific fiberglass vaulting pole is described in detail in Jenks, U.S. Pat. No. 3,969,557, issued Jul. 13, 1976, which is incorporated by reference. The Jenks pole contains at least three layers of fiberglass tapes and cloth—the first (inner) layer is a helical-wrapped fiberglass tape, the second layer is a fiberglass cloth body piece, and the third layer is another helical-wrapped fiberglass tape. An optional fourth layer is a fiberglass trapezoidal sail piece.

In the late 1980s, straight run carbon fiber tapes and sheets became commercially available. As the name implies, the carbon fibers in these tapes and sheets run parallel to each other. Straight run carbon fiber tapes and sheets have substantial strength in only the direction of the fibers. As a result, they have been used as the helical tape and in straight body pieces where only one-dimensional strength is needed. Vaulting poles containing straight run carbon fibers typically weigh about ten percent less than a comparable pole made completely of fiberglass.

In the pursuit of even higher vaults, a demand exists for a vaulting pole that is even lighter in weight than fiberglass and straight run carbon fiber poles, but is similar or superior in other properties.

SUMMARY OF THE INVENTION

A general object of this invention is to provide an improved vaulting pole. A more particular object is to provide a vaulting pole that is lighter in weight than fiberglass and straight run carbon poles, but is similar or superior in other properties.

We have invented a vaulting pole that is made of four layers of fiberglass and carbon fiber. The first layer comprises a fiberglass or straight run carbon fiber material oriented such that at least half of the fibers are transverse to the longitudinal axis, the second layer comprises at least one circumference of a fiberglass or carbon fiber inner body wrap, the third layer comprises a fiberglass or carbon fiber trapezoidal sail piece, and the fourth layer comprises at least one circumference of a fiberglass or carbon fiber body wrap. At least one of the second, third, or fourth layers comprises carbon weave.

The vaulting pole of this invention weighs about ten to twenty percent less than a comparable fiberglass and straight run carbon fiber pole and yet is similar or superior in other properties.

BRIEF DESCRIPTION OF THE DRAWINGS

FIG. 2 is a perspective view of the fourth and fifth layers of material that are used to manufacture a preferred embodiment of the vaulting pole of this invention.

FIG. 3 is a perspective view of a layer of material that is an alternate for the third and fourth layers of material.

DETAILED DESCRIPTION OF THE INVENTION

1. The Mandrel

Figure 1:
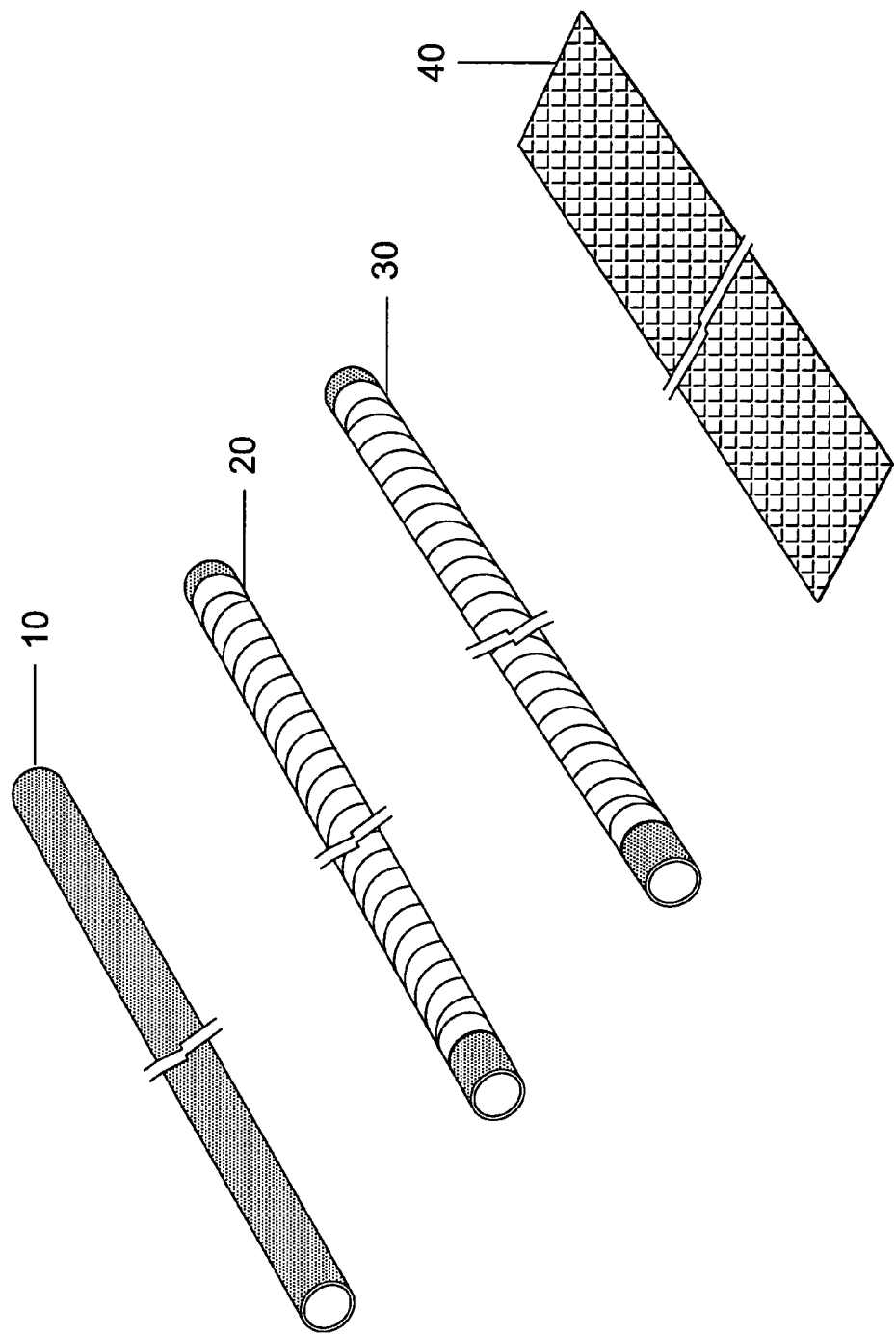
FIG. 1 is a perspective view of a mandrel and the first three layers of material that are used to manufacture a preferred embodiment of the vaulting pole of this invention.

The vaulting pole of this invention comprises multiple layers of fiberglass or carbon fiber materials that are applied to a mandrel 10, heated, cooled, and then separated from the mandrel. The pole is generally constructed to a length less than that of the mandrel. The pole is also generally constructed several inches longer than the desired length of the finished pole. The ends of the pole sometimes contain imperfections and the additional length allows the ends to be cut off. Caps are then placed on the ends. The mandrel is a metal pole having a length of about fifteen to eighteen feet and an outside diameter of about one to one and one-half inches. The mandrel is preferably tapered slightly so that it can be easily removed from within the finished pole.

2. The First Layer

The first layer is made of fiberglass or straight run carbon fiber material that is wrapped around the mandrel such that at least half of the fibers are transverse to the longitudinal axis of the pole. In other words, half or less of the fibers are parallel to the longitudinal axis. As previously discussed, transverse fibers provide hoop strength to the finished pole. One suitable first layer comprises fiberglass thread that is helically wound upon the mandrel. The thread is wound in one direction until the desired length is reached and then wound in the opposite direction. The winding continues until the desired thickness is achieved. In this type of layer, all the fibers are transverse to the longitudinal axis of the pole. Another suitable first layer comprises a rectangular body wrap of a material having woven, perpendicular fibers. In this type of layer, half the fibers are transverse to the longitudinal axis of the pole.

The preferred first layer comprises two pieces of fiberglass tape that are helically wrapped upon the mandrel as shown in FIG. 1. The first piece of tape 20 is butt-jointed (the sides of the tape are wound against each other but they do not overlap). This piece of tape runs the desired length. As discussed above, this length is generally several inches longer than the desired finish length of the pole. The tape generally has a width of about one and one-half inches. A preferred tape is S-GLASS FIBER tape, a commercial product of Cytec Engineered Materials, a subsidiary of Cytec Industries Inc. of West Patterson, N.J. The second piece of tape 30 is similar to the first except it is oriented crosswise relative to the first layer so the joints in the first and second layers are not superimposed. Superimposed joints lack the strength of crosswise joints. In the preferred first layer, all the fibers are transverse to the longitudinal axis of the pole.

3. The Second Layer

The second layer is at least one circumference (i.e., the layer extends completely around the layer beneath it) of an inner body wrap 40. The inner body wrap is shown in FIG. 1 as it appears before it is wrapped around the pole. The inner body wrap is generally one to three circumferences in width, preferably one circumference. In other words, if the first layer upon the mandrel has an outside diameter of 1.5 inches, the preferred width of the inner body wrap is 1.5 inches times pi, or about 4.7 inches. The inner body wrap generally has a length equal to the length of the first layer.

The inner body wrap is made of woven fiberglass or carbon fiber. A suitable fiberglass is S-GLASS FIBER cloth. The inner body wrap is preferably made of carbon weave cloth because of its lighter weight and its strength in both its length and width. A preferred carbon weave is T300 3K NT cloth, a commercial product of Cytec Engineered Materials, a subsidiary of Cytec Industries Inc. of West Patterson, N.J. This standard modulus carbon weave cloth is resin impregnated and contains tightly woven carbon fibers, each roll of which has a width of about forty-two inches. The material is preferably oriented with half the fibers running parallel, and half the fibers running perpendicular, to the longitudinal axis of the pole.

4. The Third Layer

The third layer is a trapezoidal sail piece 50. The sail piece is shown in FIG. 2 as it appears before it wrapped around the pole. The shape and size of the sail piece, and its position on the pole, are varied as desired to produce the characteristics desired in the finished vaulting pole. The base of the sail piece generally has a length equal to 80 to 100 percent of the length of the first and second layers, preferably about 90 percent of the length. The top of the sail piece generally has a length equal to about 5 to 50 percent of the base, preferably about 10 percent of the base. For example, if the base is 90 percent of the length of the first layer and the top is 10 percent of the base, the top is 9 percent of the length of the first layer. The angled sides of the sail piece are generally symmetrical (i.e., the trapezoidal is isosceles). The width of the trapezoidal sail piece is generally two to five circumferences. The number of circumferences generally increases as the length and desired stiffness of the pole increases. If the base of the sail piece is less than the length of the pole, the sail piece is generally positioned on the pole starting at the tip end (the end planted—opposite the end held by the vaulter).

The sail piece is generally made from the same material as the inner body wrap. If the sail piece and inner body wrap are made of the same material, they may be combined as a single piece of material 4050 as shown in FIG. 3. The material is preferably oriented with half the fibers running parallel, and half the fibers running perpendicular, to the longitudinal axis of the pole.

5. The Fourth Layer

The fourth layer is at least one circumference of an outer body wrap 60. The outer body wrap is shown in FIG. 2 as it appears before it is wrapped around the pole. The outer body wrap is preferably two circumferences in width and has a length equal to the length of the first and second layers. Like the inner body wrap, the outer body wrap is made of fiberglass or carbon fiber. However, where carbon weave is the preferred material for the inner body wrap and sail piece, fiberglass is the preferred material for the outer body wrap for several reasons. Before the pole is cured, a silicone sleeve is placed over the pole. The sleeve helps to prevent shifting of the resin until hardening takes place and fiberglass is less likely to stick to the silicone sleeve. Another reason fiberglass is preferred over carbon fiber is that fiberglass is slightly more durable and elastic.

While the second, third, and fourth layers are each made of fiberglass or carbon fiber, at least one of the layers is carbon weave. The weight reduction, as compared to a conventional all-fiberglass pole, depends on whether one, two, or all three of the layers are made of carbon weave. When only one layer is made of carbon weave, the weight reduction is typically about ten percent. When two or three layers are made of carbon weave, the weight reduction is typically about twenty percent. In all other properties, including hoop strength, column load bearing capacity, flex strength, resistance to splitting, and durability, the carbon weave vaulting pole of this invention is comparable or superior to a conventional fiberglass or straight run carbon fiber pole.

We claim:

1. A vaulting pole having a longitudinal axis, the vaulting pole comprising:
   (a) a first layer comprising a fiberglass material containing fibers of glass or a straight run carbon fiber material containing fibers of carbon, the layer being oriented such that at least half of the fibers in the first layer are transverse to the longitudinal axis;
(b) a second layer comprising at least one circumference of a fiberglass or carbon fiber inner body wrap;
(c) a third layer comprising a fiberglass or carbon fiber trapezoidal sail piece; and
(d) a fourth layer comprising at least one circumference of a fiberglass or carbon fiber outer body wrap;

wherein at least one of the second, third, and fourth layers comprises carbon weave.

2. The vaulting pole of claim 1 wherein only the inner body wrap comprises carbon weave.

3. The vaulting pole of claim 1 wherein only the sail piece comprises carbon weave.

4. The vaulting pole of claim 1 wherein only the inner body wrap and sail piece comprise carbon weave.

5. The vaulting pole of claim 4 wherein the inner body wrap and sail piece are oriented such that about half of the fibers in each layer are substantially parallel to the longitudinal axis and about half of the fibers are substantially perpendicular to the longitudinal axis.

6. The vaulting pole of claim 5 wherein substantially all the fibers in the first layer are transverse to the longitudinal axis.

7. The vaulting pole of claim 6 wherein the second layer consists of one circumference of the carbon weave inner body wrap.

8. A vaulting pole comprising:
(a) a first layer comprising a first piece of helical-wrapped butt-jointed fiberglass or carbon fiber tape and a second piece of helical-wrapped butt-jointed fiberglass or carbon fiber tape, wherein the second piece of tape is oriented crosswise to the first piece of tape;
(b) a second layer comprising at least one circumference of a fiberglass or carbon fiber inner body wrap;
(c) a third layer comprising a fiberglass or carbon fiber trapezoidal sail piece; and
(d) a fourth layer comprising at least one circumference of a fiberglass or carbon fiber outer body wrap;

wherein at least one of the second, third, and fourth layers comprises carbon weave.

9. The vaulting pole of claim 8 wherein only the sail piece comprises carbon weave.

10. The vaulting pole of claim 8 wherein only the inner body wrap comprises carbon weave.

11. The vaulting pole of claim 8 wherein only the sail piece and the inner body wrap comprise carbon weave.

12. The vaulting pole of claim 11 wherein inner body wrap and sail piece are oriented such that about half of the fibers in each layer are substantially parallel to the longitudinal axis and about half of the fibers are substantially perpendicular to the longitudinal axis.

* * * * *